(12) United States Patent
Maloo

(10) Patent No.: US 8,103,780 B2
(45) Date of Patent: Jan. 24, 2012

(54) SYSTEMS AND METHODS FOR DETERMINING THE LOCATION OF A REQUEST ON A CONTENT DELIVERY NETWORK

(75) Inventor: Sunil Maloo, Edison, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 243 days.

(21) Appl. No.: 12/337,930

(22) Filed: Dec. 18, 2008

(65) Prior Publication Data

US 2010/0161760 A1   Jun. 24, 2010

(51) Int. Cl.
*G06F 15/16* (2006.01)
*H04N 7/173* (2006.01)

(52) U.S. Cl. ........... 709/227; 725/109

(58) Field of Classification Search ........... 709/227
See application file for complete search history.

(56) References Cited

U.S. PATENT DOCUMENTS

| | | | |
|---|---|---|---|
| 6,098,111 A * | 8/2000 | Maegawa et al. ............ 719/310 |
| 6,513,061 B1 * | 1/2003 | Ebata et al. ............ 709/203 |
| 6,553,413 B1 * | 4/2003 | Leighton et al. ............ 709/219 |
| 6,654,807 B2 | 11/2003 | Farber et al. |
| 6,976,090 B2 * | 12/2005 | Ben-Shaul et al. ............ 709/246 |
| 7,054,935 B2 | 5/2006 | Farber et al. |
| 7,133,905 B2 | 11/2006 | Dilley et al. |
| 7,219,153 B1 | 5/2007 | Day |
| 7,289,519 B1 * | 10/2007 | Liskov ............ 370/400 |
| 7,340,505 B2 * | 3/2008 | Lisiecki et al. ............ 709/217 |
| 7,376,716 B2 | 5/2008 | Dilley et al. |
| 7,693,959 B2 * | 4/2010 | Leighton et al. ............ 709/217 |
| 8,024,468 B2 * | 9/2011 | Raciborski et al. ............ 709/227 |
| 2002/0010798 A1 * | 1/2002 | Ben-Shaul et al. ............ 709/247 |
| 2002/0052942 A1 * | 5/2002 | Swildens et al. ............ 709/223 |
| 2004/0010562 A1 * | 1/2004 | Itonaga ............ 709/213 |
| 2004/0139170 A1 * | 7/2004 | Shen et al. ............ 709/218 |
| 2006/0031394 A1 * | 2/2006 | Tazuma ............ 709/217 |

* cited by examiner

*Primary Examiner* — Jeffrey Pwu
*Assistant Examiner* — Guang Li
(74) *Attorney, Agent, or Firm* — Larson Newman, LLP

(57) ABSTRACT

A client computing system includes a processor that receives a domain name and determines if the domain name is in a list of domain names that are associated with a content delivery network (CDN). In response to determining that the first domain name is in the list, the processor directs a domain name system (DNS) request to a CDN DNS server, instead of to the default DNS server.

20 Claims, 6 Drawing Sheets

SYSTEMS AND METHODS FOR DETERMINING THE LOCATION OF A REQUEST ON A CONTENT DELIVERY NETWORK

FIELD OF THE DISCLOSURE

The present disclosure generally relates to communications networks, and more particularly relates to systems and methods for directing content requests to servers.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to an edge server situated closer to the client issuing the request. CDNs either co-locate edge servers within Internet Service Providers or deploy them within their own networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
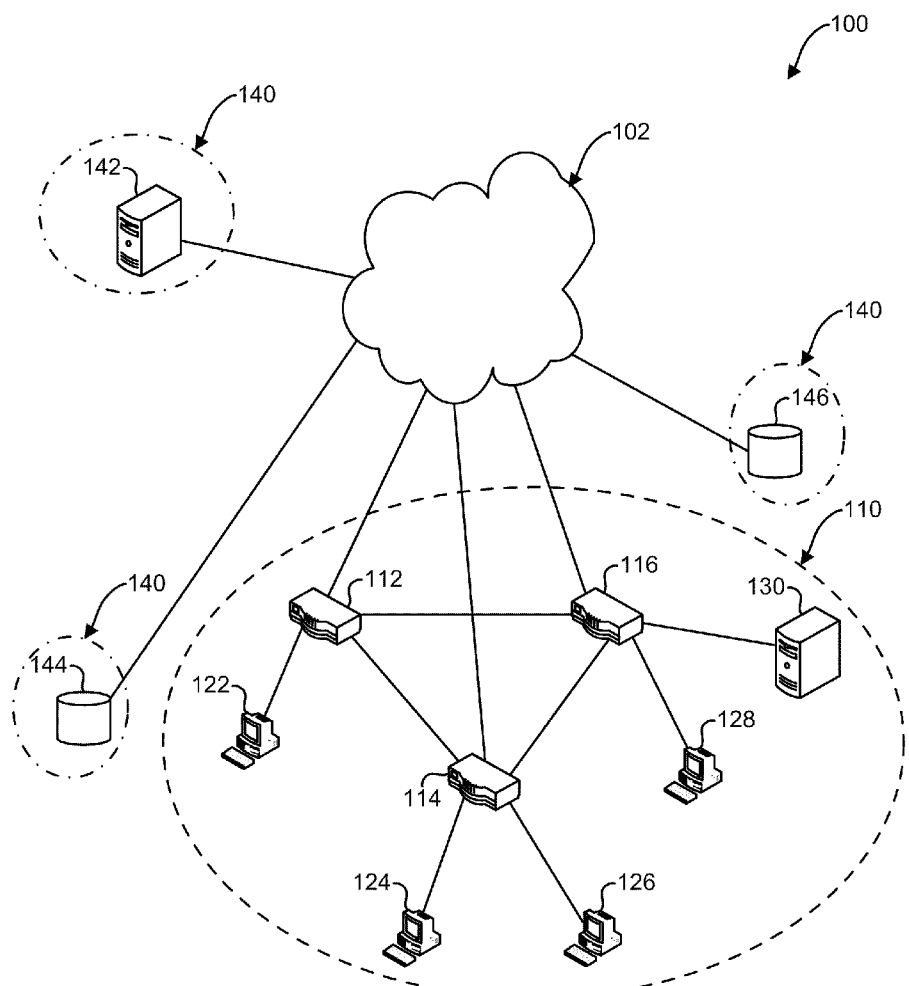
FIG. 1 is a schematic diagram showing a communication network, including an autonomous network and a content distribution network (CDN)

FIG. 1 shows a communication network 100. Communication network 100 includes an autonomous network (AN) 110 and a content distribution network (CDN) 140 that are connected together through a network 102, such as the Internet. AN 110 includes routers 112, 114, and 116 that communicate with each other. AN 110 connects to network 102 through routers 112, 114, and 116, permitting AN 110 to connect to other ANs (not illustrated) in communication network 100, and otherwise gain access to resources and content on communication network 100. AN 110 also includes client systems 122, 124, 126, and 128, and Internet service provider domain name system (ISP DNS) server 130. Client system 122 is connected to router 112, client systems 124 and 126 are connected to router 114, and client system 128 and ISP DNS server 130 are connected to router 116. Client systems 122, 124, 126, and 128, and ISP DNS server 130 gain access to resources and content on communication network 100 through their respective routers 112, 114, and 116. As such, router 112 provides ingress and egress to communication network 100 for client system 122, router 114 provides ingress and egress for client systems 124 and 126, and router 116 provides ingress and egress for client system 128 and for ISP DNS server 130. A non-limiting example of a client system 122, 124, 126, or 128 includes a personal computer, a laptop computer, a set-top box, a handheld computing device, another general purpose computing system, or a combination thereof. In a particular embodiment (not illustrated), one or more of routers 112, 114, and 116 are not connected directly to network 102. For example, router 114 may not be connected directly to network 102. Here client systems 124 and 126 obtain ingress and egress to communication network 100 through router 114, and either router 112 or 116, depending upon routing conditions in AN 110.

While not shown to scale, FIG. 1 represents client systems 122, 124, 126, and 128 as being in close proximity to each other, and DNS ISP server 130 as being more remote from client systems 122, 124, 126, and 128. Client systems 122, 124, 126, and 128, and DNS ISP server 130 each have a unique public routable Internet Protocol (IP) address. For example, client system 122 can have an IP address of 123.123.112.122, client system 124 can have an IP address of 123.123.114.124, client system 126 can have an IP address of 123.123.114.126, client system 128 can have an IP address of 123.123.116.128, and DNS ISP server 130 can have an IP address of 123.123.116.130. For example, client systems 122, 124, 126, and 128 can be located in New York City, and DNS ISP server 130 can be located in Chicago.

CDN 140 includes a content distribution network domain name system (CDN DNS) server 142, and edge servers 144 and 146. CDN 140 is a distributed network, with edge servers 144 and 146 situated at different locations in communication network 100. For example, edge server 144 can be located in New Jersey, and edge server 146 can be located in Chicago. CDN 140 connects to network 102 through peering points at CDN DNS server 142, and edge servers 144 and 146. With respect to communication network 100, the closest edge server may be the edge server having a shortest network distance, a lowest network cost, a lowest network latency, a highest link capacity, another measure of proximity on a network, or any combination thereof. As such, the distance between an edge server and a client system may be different from the geographic distance. While CDN DNS server 142 and edge servers 144 and 146 are shown as separate elements, it is also possible that the functions of CDN DNS server 142, as described below, can be merged into one or more of edge servers 144 and 146. It is also possible to locate CDN DNS server 142 and edge servers 144 and 146 within AN 110.

Client systems 122, 124, 126, and 128 can retrieve information from communication network 100. For example, client system 124 can retrieve a content provider's webpage, where the web page content resides on a content server (not illustrated). Additionally, client system 124 may download content files, such as graphic, audio, and video content, and program files such as software updates, from the content server. However, client systems 122, 124, 126, and 128 need to know the IP address of the content server in order to retrieve the information.

When a user knows the IP address of the content server, then the user can request the information directly from the content server. However, it is more often the case that a user does not know the IP address of the content server, but instead knows a domain name associated with the desired content. For example, a user of client system 124 may know that the desired information is located on a server associated with the domain name "www.att.com." In this case, the user can enter a Uniform Resource Locator (URL), including the domain name, into client system 124. Client system 124 attempts to resolve the domain name into a known IP address of the content server associated with the domain name. The resolution is done by referring to an operating system (OS) host file that includes a list of domain names and their associated IP addresses (hereinafter referred to as domain name/IP address pairs). If the OS host file includes a domain name/IP address pair for the domain name in the URL, then client system 124 sends an information request to the IP address of the content server associated with the domain name, and the content server returns the requested information.

When the OS host file does not include a domain name/IP address pair for the domain name included in the URL, then client system 124 sends a DNS request to ISP DNS server 130. The DNS request is a request for ISP DNS server 130 to resolve the domain name into the IP address of the content server associated with the domain name. ISP DNS server 130 forwards the DNS request to an authoritative DNS server (not illustrated) for the domain to which the domain name belongs. The authoritative DNS server replies to ISP DNS server 130 with the IP address of the content server associated with the domain name, and ISP DNS server 130 in turn replies to client system 124 with the IP address. Client system 124 then sends an information request to the IP address of the content server, and the content server returns the requested information. ISP DNS server 130 also stores the domain name/IP address pair in a cache, so that, when ISP DNS server 130 receives a subsequent DNS request, ISP DNS server 130 can attempt to resolve the domain name by referring first to the cache. Then, if the cache includes the domain name/IP address pair for the domain name in the DNS request, then DNS ISP server 130 can reply directly to client system 124 without sending the DNS request to the authoritative DNS server.

The time required for client system 124 to retrieve the information from the content server normally relates to the size of the file, the distance the information travels, and congestion along the route. Additionally, the load on the content server is related to the number of client systems 122, 124, 126, and 128 that are actively retrieving information at the same time. Therefore, resources such as processors, memory, and content server bandwidth limit the number of client systems 122, 124, 126, and 128 that can simultaneously retrieve information from the content server.

A content provider can use CDN 140 to reduce the load on the content server. As such, edge servers 144 and 146 replicate the information found on the content server at locations within communication network 100 that are closer to client systems 122, 124, 126, and 128. When client system 122, 124, 126, or 128 request information from the content provider, a request for DNS resolution is sent to ISP DNS server 130. ISP DNS server 130 requests the IP address corresponding to the domain name from the authoritative DNS server. When the domain name is for a content provider that uses CDN 140 to reduce the load on their content server, the authoritative DNS server for that domain name is CDN DNS server 142. CDN DNS server 142 provides the IP address of a closer edge server 144 or 146 based upon the source IP address of the DNS request, that is, the IP address of ISP DNS server 130. ISP DNS server 130 returns the IP address of the selected edge server 144 or 146 to the requesting client system 122, 124, 126, or 128. The requesting client system 122, 124, 126, or 128 sends an information request to the selected edge server 144 or 146, which returns the requested information. CDN DNS server 142 determines which edge server 144 or 146 to redirect the request to, based upon the shortest network distance, the lowest network cost, the lowest network latency, the highest link capacity, another measure of proximity on a network, or any combination thereof. As such, the distance between the selected edge server 144 or 146 and the requesting client system 122, 124, 126, or 128 may be different from the geographic distance. It is also possible for more than one content provider to use the same CDN 140.

Figure 2:
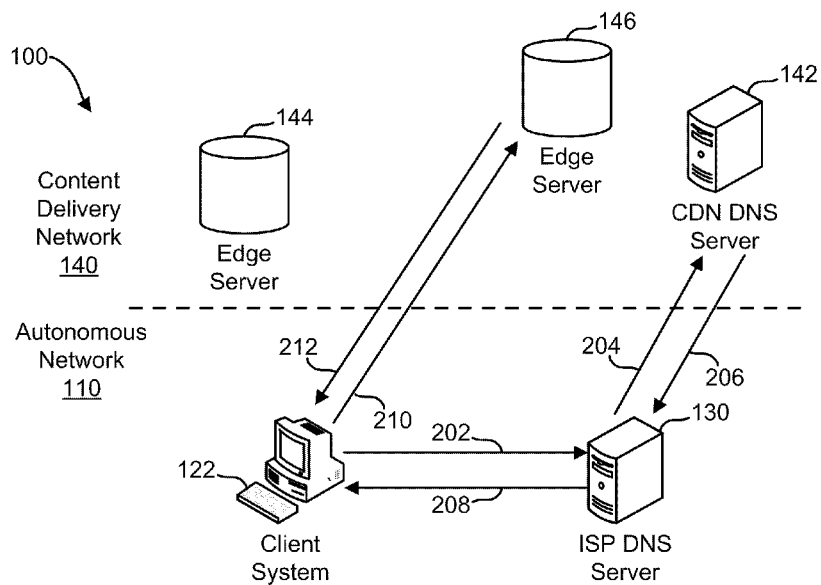
FIG. 2 is a schematic illustration showing interactions between elements of the communication network of FIG. 1 that provide content from the CDN to a client system.

FIG. 2 illustrates interactions between elements of communication network 100 to provide client system 122 with content from CDN 140. When client system 122 desires to receive information from a content provider that uses CDN 140, client system 122 sends a DNS request 202 to ISP DNS server 130. ISP DNS server 130 attempts to resolve the IP address associated with the requested domain name, translating the domain name into an IP address. If the domain name/IP address pair is not in the cache of ISP DNS server 130, ISP DNS server 130 forwards a DNS request 204 to CDN DNS server 142. DNS request 204 includes at least the domain name to be resolved, and the source IP address of DNS request 204, that is, the IP address of ISP DNS server 130. CDN DNS server 142 determines which of edge servers 144 or 146 is closer to the source IP address of DNS request 204. However, a different edge server 144 or 146 may actually be closer to the source IP address of DNS request 202, but the source IP address of DNS request 202 is masked by the actions of ISP DNS 130.

Using the previous examples, based on the IP address of ISP DNS server 130, located in Chicago, CDN DNS server 142 selects edge server 146, also located in Chicago, as closer to the source of DNS request 204, and sends a reply 206 to ISP DNS server 130 including the IP address of edge server 146 as the location of the requested information. ISP DNS server 130 the IP address of edge server 146 to client system 122 in a reply 208. Upon receipt of reply 208, client system 122 sends an information request 210 for the information to edge server 146. Edge server 146 sends a reply 212 with the requested information to client system 122. Although edge server 144, located in New Jersey is actually closer to client system 122, located in New York, CDN DNS server 142 selects edge server 146 in Chicago to provide the requested information based upon the source IP address of ISP DNS server 130 which is also in Chicago. In other words, ISP DNS server 130 masks the origin of DNS request 202, preventing CDN DNS server 142 from selecting the closer of edge servers 144 and 146 to provide the response to information request 210.

Figure 3:
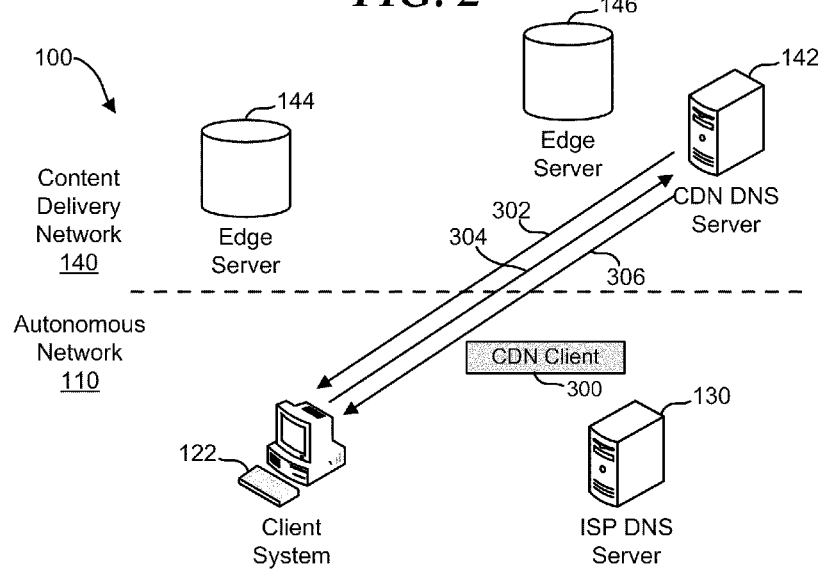
FIG. 3 is a schematic illustration showing downloading CDN client software to the client system.

In an embodiment of the present disclosure, CDN DNS server 142, edge servers 144 or 146, or another server in CDN 140 can determine if client systems 122, 124, 126, and 128 have requested information from CDN 140 before, for example by examining cookies on client systems 122, 124, 126, and 128. If client systems 122, 124, 126, and 128 have not previously requested information from CDN 140, then in addition to redirecting client systems 122, 124, 126, and 128 to edge servers 144 and 146, CDN 140 can download CDN client software (shown as element 300 in FIG. 3) to client systems 122, 124, 126, and 128. FIG. 3 illustrates downloading CDN client software 300 to client system 122. CDN DNS server 142 sends a request 302 to client system 122, prompting the user of client system 122 to decide whether or not to download CDN client software 300. If the user of client system 122 decides to download CDN client software 300, the user can so indicate, and client system 122 sends a reply 304 to CDN DNS server 142. Upon receiving reply 304, CDN DNS server 142 sends a download 306 to client system 122. Download 306 includes CDN client software 300 that may be installed on client system 122. In another embodiment, edge server 146, or another server in CDN 140 (not illustrated) functions similarly to CDN DNS server 142, by sending request 302, receiving reply 304, and sending download 306. In another embodiment, sending request 302, receiving reply 304, and sending download 306 can be performed by a combination of CDN DNS server 142, edge server 146, and another server in CDN 140 (not illustrated). In yet another embodiment (not illustrated), one or more of request 302, reply 304, and download 306 can pass through ISP DNS 130.

In a particular embodiment, the CDN client software (shown as element 400 in FIG. 4) functions to intercept a DNS request from client systems 122, 124, 126, and 128, determine if the domain name in the DNS request corresponds to CDN 140, and based upon the determination either direct the DNS request to CDN DNS server 142 for domain names that correspond to CDN 140, or to ISP DNS server 130 for other domain names. Thus, CDN DNS server 142 receives a DNS request with the source IP address of client systems 122, 124, 126, and 128, and not with the source IP address of ISP DNS server 130. In this way, CDN DNS server 142 can select a closer edge server 144 or 146 based upon the true location of the requester. In another embodiment, CDN client software 400 can be updated by CDN 140 on a periodic basis such that the IP address of CDN DNS serve 142 remains currently valid. As such, CDN client software 400 can be updated every hour, daily, weekly, or on any other suitable time period. In another embodiment, the client system is instructed by the CDN 140 to download the client from the CDN DNS server 142 or a similar server.

Figure 4:
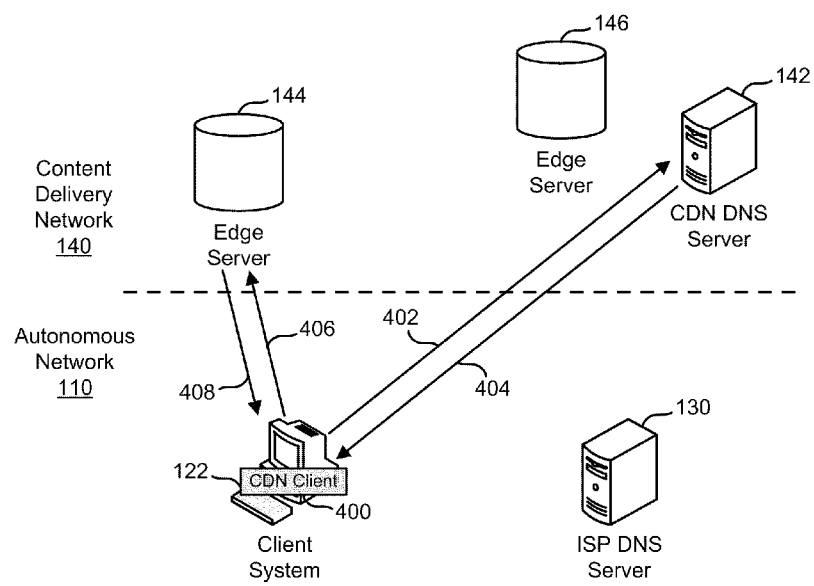
FIG. 4 is a schematic illustration showing interactions between elements of the communication network after installing the CDN client software on the client system.

FIG. 4 illustrates interactions between elements of communication network 100 after CDN client software 400 is installed on client system 122. Here, when client system 122 desires to receive information from a content provider, CDN client software 400 intercepts the DNS request, and determines if the domain name in the DNS request corresponds to CDN 140. If the domain name corresponds to CDN 140, client system 122 sends a DNS request 402 to CDN DNS server 142. DNS request 402 includes the domain name to be resolved and the IP address of client system 122 as the source IP address of DNS request 402. CDN DNS server 142 determines which of edge servers 144 or 146 is closer to client system 122, based upon the source IP address included in DNS request 402. Here, DNS request 402 includes the IP address of client system 122, located in New York City, and so CDN DNS server 142 determines that edge server 144, located in New Jersey, is closer and may provide content more efficiently to client system 122. CDN DNS server 142 sends a reply 404 to client system 122 that includes the IP address of edge server 144 as the location of the requested information. Upon receipt of the reply 404, client system 122 sends an information request 406 to edge server 144. Edge server 144 then provides the requested information 408 to client system 122.

In another embodiment, the CDN client software (shown as element 500 in FIG. 5) functions to resolve domain names served by CDN 140 into the IP address of a closer edge server 144 or 146. Here, CDN client software 500 includes a CDN host file that functions similarly to the OS host file described above. The CDN host file includes domain names/IP address pairs for the domain names of content providers that use CDN 140, and IP addresses of closer edge servers 144 and 146. When client systems 122, 124, 126, and 128 send a DNS request, CDN client software 500 checks the domain name in the DNS request against the CDN host file, and if the domain name is found, then client systems 122, 124, 126, and 128 send an information request to the associated edge server 144 or 146 as determined by the domain name/IP address pair. CDN client software 500 periodically sends a request to CDN 140 to obtain a current list of closer edge servers 144 or 146. Because the request includes the IP address of client systems 122, 124, 126, and 128 as the source address of the request, CDN 140 can select a closer edge server 144 or 146 based upon the true location of the requester. CDN client software 500 can be send a request every hour, daily, weekly, or on any other suitable time period. In a particular embodiment, CDN host file can be included in the OS host file.

Figure 5:
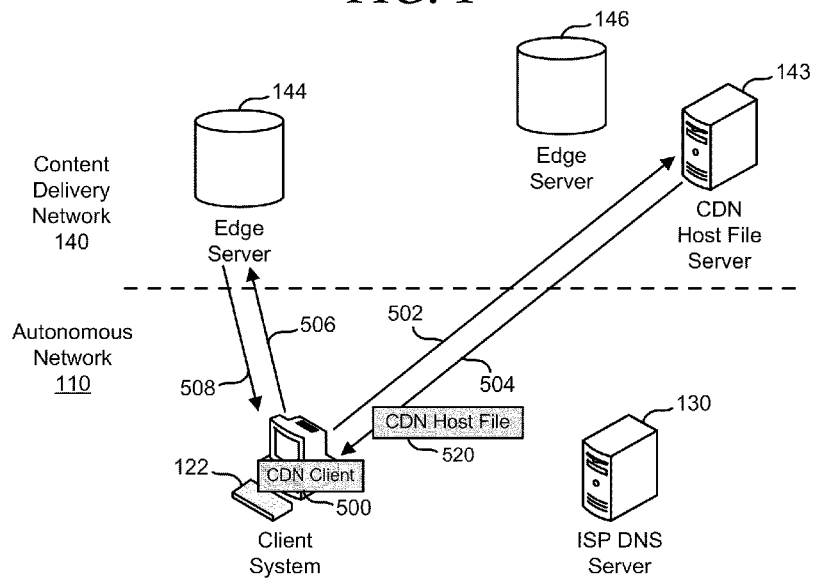
FIG. 5 is a schematic illustration showing interactions between elements of the communication network after obtaining the IP address of an edge server from a CDN domain name server.

FIG. 5 illustrates interactions between elements of communication network 100 after CDN client software 500 is installed on client system 122. Here, at a time prior to a request for information, client system 122 sends a request 502 to a CDN host file server 142. Request 502 includes the IP address of client system 122, with which CDN 140 can determine a closer edge router 144 to client system 122. CDN host file server 143 sends a reply 504 that includes the CDN host file 520. Then, when client system 122 desires to receive information from a content provider, CDN client software 500 intercepts the DNS request, and determines if the domain name is included in CDN host file 520. If the domain name is included in CDN host file 520, client system 122 sends a content request 506 to the IP address that corresponds to the domain name. Here, since request 502 included the IP address of client system 122 as the source address, CDN host file 520 includes the IP address of edge server 144 for domain names associated with CDN 140, and request 506 is sent to edge server 144. Edge server 144 then provides the requested information 508 to client system 122.

Figure 6:
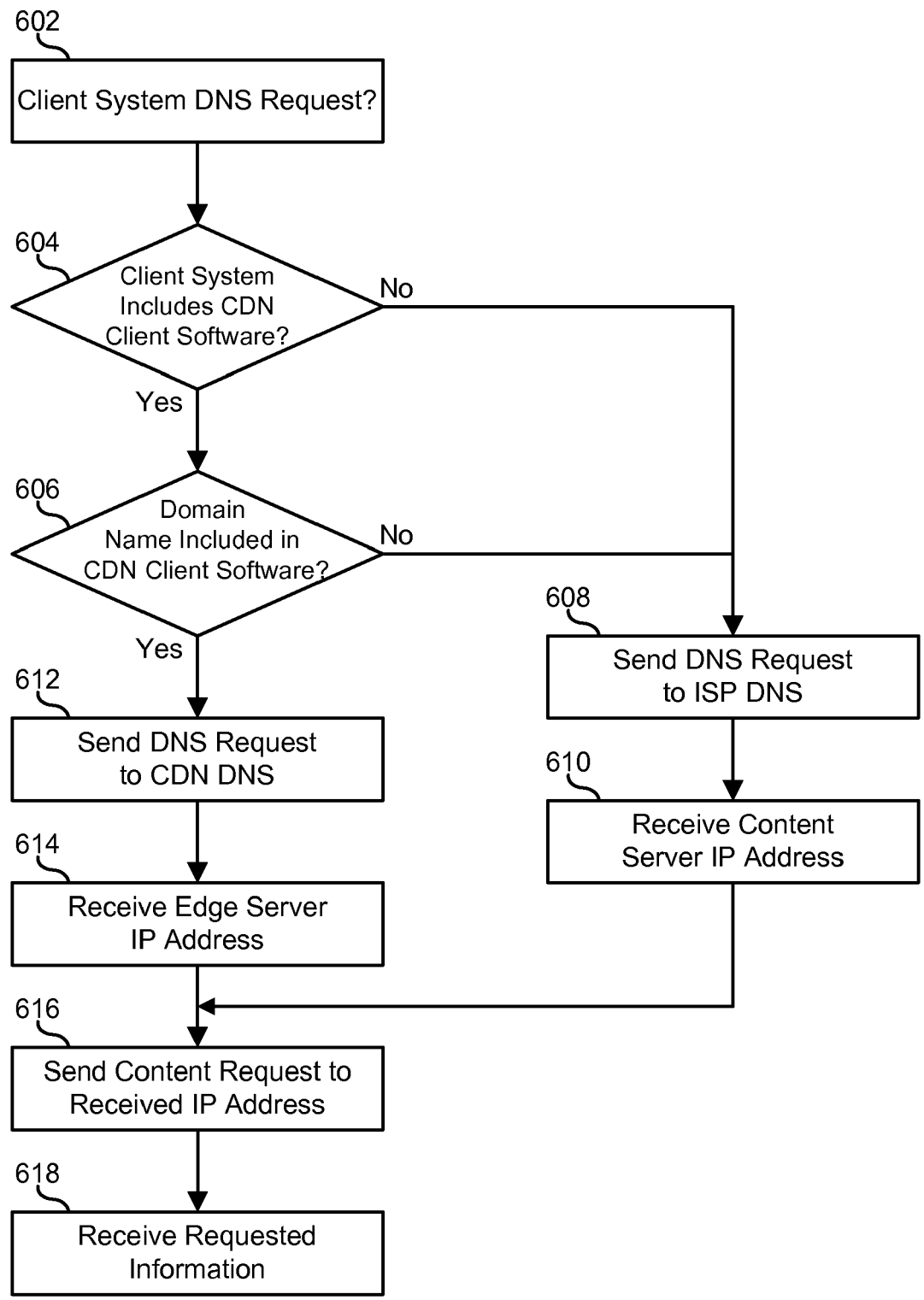
FIG. 6 is a flow chart showing a method of providing the client system with content from the CDN.

FIG. 6 illustrates a method of providing a client system with information from a CDN. A DNS request is initiated at a client system in block 602. For example, the client system can initiate an HTTP request in a browser that identifies the domain name of a content provider with the information on a communication network. A decision is made as to whether or not the client system includes CDN client software in decision node 604. If so, then the "YES" branch of decision node 604 is taken, and a decision is made as to whether or not the domain name of the DNS request is included in the CDN client software in decision node 606. If either the client system does not include CDN client software, resulting in the "NO" branch of decision node 604 being taken, or the domain name of the DNS request is not included in the CDN client software, resulting in the "NO" branch of decision node 606 being taken, then the DNS request is sent to the ISP DNS server for further processing in block 608. For example, a DNS request can be sent from a client system to an ISP DNS server. If the DNS request is for content that is not contained in the CDN, the DNS request can be handled by the ISP DNS server in accordance with the ISP's normal practice. If the DNS request is for content that is contained in the CDN, and the DNS request can be handled as illustrated in FIG. 2. The IP address that resolves from the domain name in the DNS request is received from the ISP DNS server by the client system in block 610.

If the domain name of the DNS request is included in the CDN client software, then the "YES" branch of decision node 606 is taken, and the DNS request is sent to the CDN DNS server for further processing in block 612. The IP address that resolves from the domain name in the DNS request is received from the CDN DNS server by the client system in block 614. When the IP address is received, either from the ISP DNS server, or from the CDN DNS server, the client system sends a content request to the received IP address in block 616, and the desired information is received by the client system in block 618.

Figure 7:
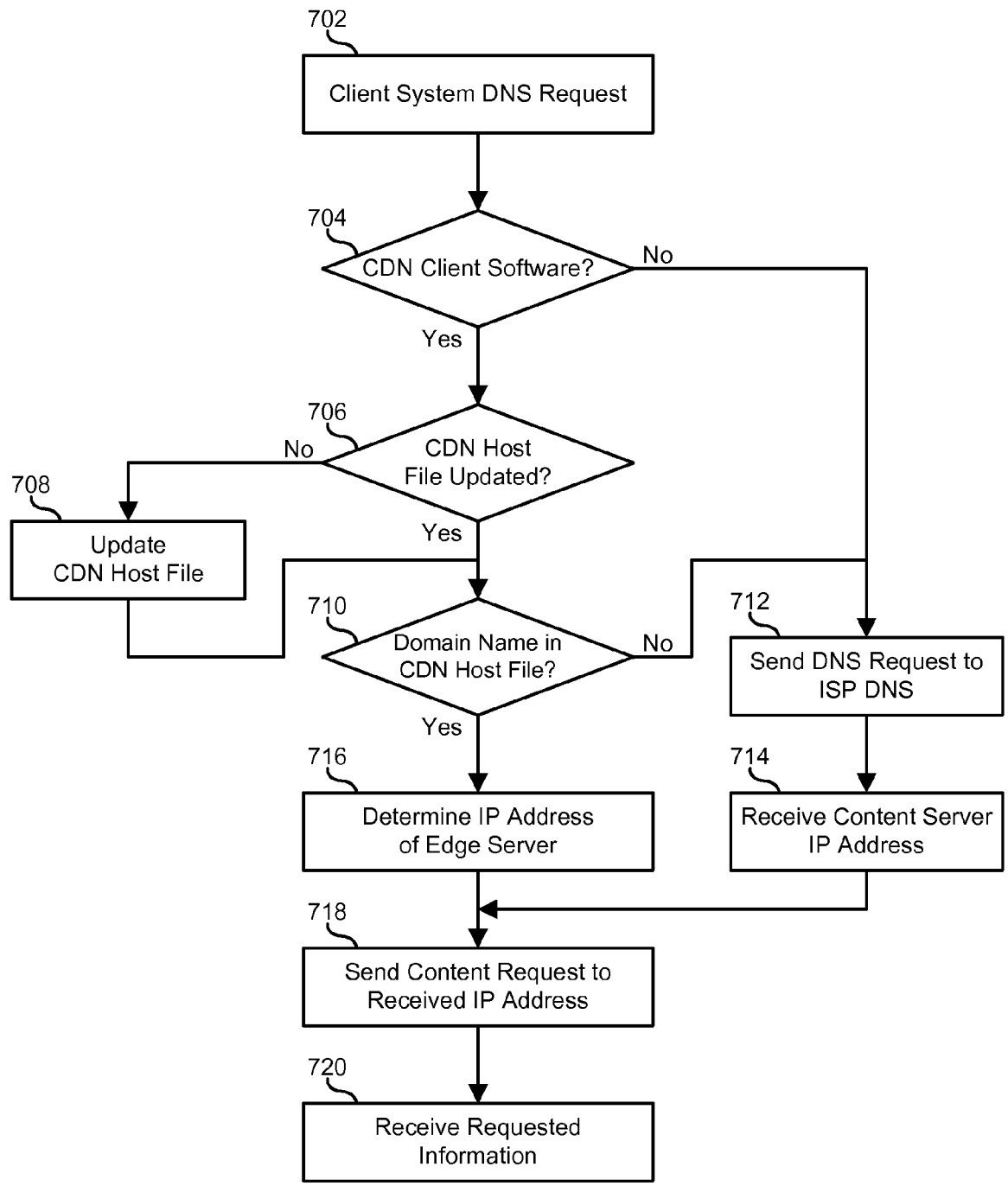
FIG. 7 is a flow chart showing another method of providing the client system with content from the CDN.

FIG. 7 illustrates another method of providing a client system with information from a CDN. A DNS request is initiated at a client system in block 702. A decision is made as to whether or not the client system includes CDN client software in decision node 704. If so, then the "YES" branch of decision node 704 is taken, and a decision is made as to whether or not the CDN host file in the CDN client software has been recently updated in decision node 706. For example, the CDN host file can be periodically updated, or can be updated on demand. If the CDN host file in the CDN client software has not been recently updated, then the "NO" branch of decision tree 706 is taken and the client software is updated in block 708. For example, the CDN client software can access a CDN host file server to obtain a CDN host file with domain name/IP address pairs. If either the CDN host file in the CDN client software was determined to have been recently updated, resulting in the "YES" branch of decision node 706 being taken, or the CDN host file in the CDN client software was updated in block 708, then a decision is made as to whether the domain name of the DNS request is included in the CDN client software in decision node 710.

If either the client system does not include CDN client software, resulting in the "NO" branch of decision node 704 being taken, or the domain name of the DNS request is not included in the CDN client software, resulting in the "NO" branch of decision node 710 being taken, the DNS request is sent to the ISP DNS server for further processing in block 712. The IP address that resolves from the domain name in the DNS request is received from the ISP DNS server by the client system in block 714. If the domain name of the DNS request is included in the CDN client software, then the "YES" branch of decision node 710 is taken, and the IP address associated with the domain name in the DNS request is determined in block 716. For example, an IP address can be determined from a domain name/IP address pair in a CDN host file. When the IP address is received, either from the ISP DNS server, or from the CDN client software, the client system sends a content request to the received IP address in block 718, and the desired information is received by the client system in block 720.

In another embodiment, a client system can be pre-populated with CDN client software from the CDN. For example, a computer manufacturer may desire to promote the services of a particular content provider, and so may include pre-populated software on their computer products that advertise for the particular content provider. Here, it may be an additional benefit to the content provider and to the computer manufacturer to speed up access to the content provider's content by including CDN client software with the pre-populated software.

A particular CDN may host more than one content provider's content, and the list of hosted content providers may change over time. In yet another embodiment, the CDN client software is updateable with a current list of domains which are to be translated to the IP address of the CDN DNS server, to keep the list current with respect to ongoing hosting activity at the CDN. In one form, the CDN client software can check a software revision level or other indication of currency each time a request is made to the CDN DNS server. If a later version of the domain list is available, then a download process similar to that shown in FIG. 3 can be done, or the download can occur automatically. In another form, the CDN client software can do a periodic lookup of the domain list by accessing a particular server that includes the current domain list.

Figure 8:
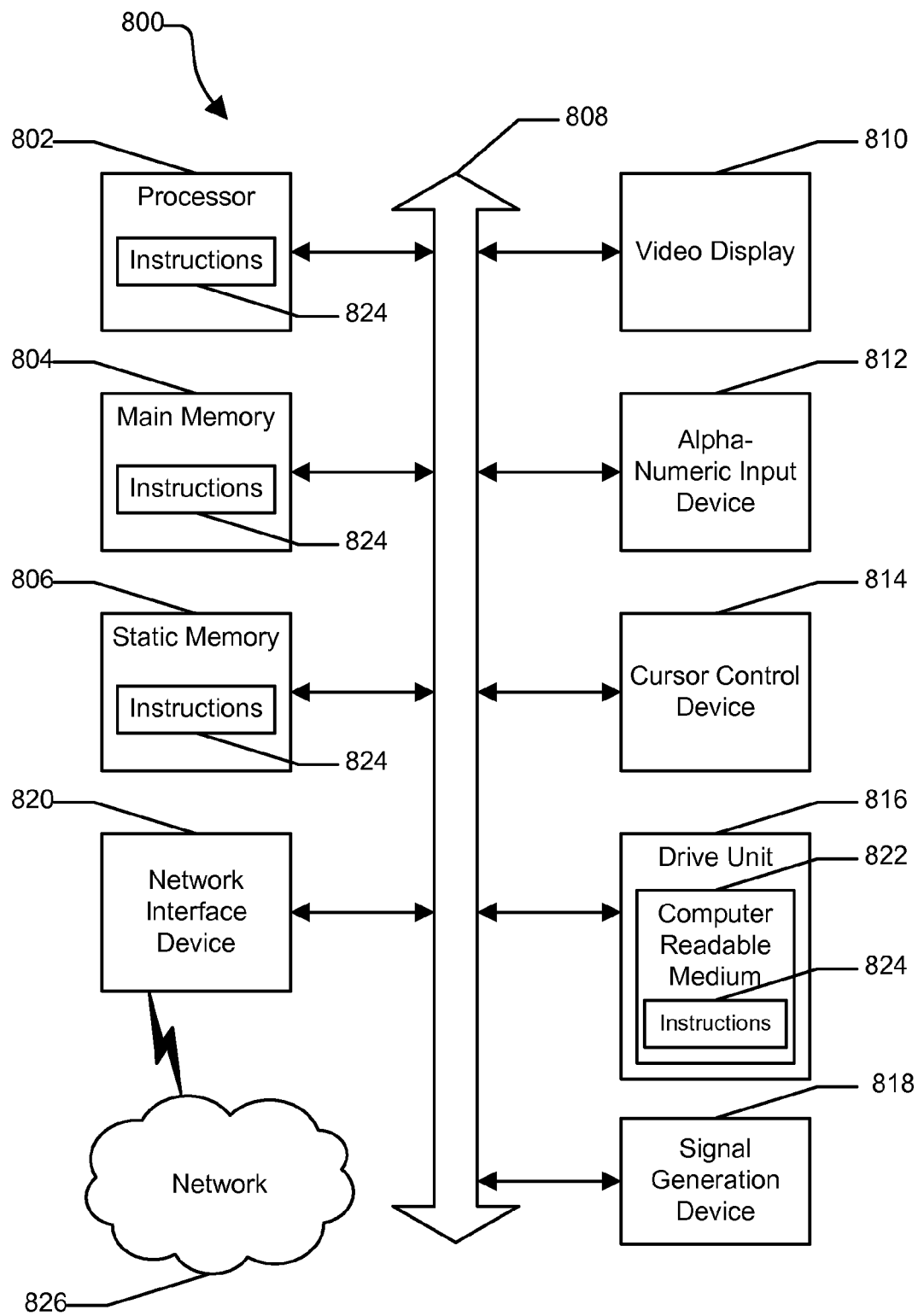
FIG. 8 shows an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid-state display, or a cathode ray tube (CRT). Additionally, the computer system 800 may include an input device 812 such as a keyboard, and a cursor control device 814 such as a mouse. Alternatively, input device 812 and cursor control device 814 can be combined in a touchpad or touch sensitive screen. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A client computing system having Internet service provided by an Internet service provider, the Internet service provider having a domain name system server, the client computing device comprising a processor operable to:
   receive a prompt from a content delivery network to download a list of domain names that are associated with the content delivery network, the content delivery network having a content delivery network domain name system server;
   provide a reply to the prompt:
   download the list of domain names from the content delivery network in response to the reply;
   originate a first domain name system request including a first domain name;
   determine whether the first domain name is in the list of domain names;
   if the first domain name is not in the list, direct the first domain name system request to the Internet service provider domain name system server; and
   if the first domain name is in the list:
      direct the first domain name system request to the content delivery network domain name system server;
      receive a first reply that includes an Internet protocol address from the content delivery network domain name system server; and
      in response to receiving the first reply, direct a first content request to the Internet protocol address.

2. The client computing device of claim 1, wherein the Internet protocol address is to a content delivery network content server.

3. The client computing device of claim 2, wherein the processor is further operable to, in response to directing the first content request, receive a second reply that includes information from the content delivery network content server.

4. The client computing device of claim 3, wherein the processor is further operable to:
   receive a second domain name system request including a second domain name;
   determine whether the second domain name is in the list; and
   in response to determining that the second domain name is in the list, direct a second content request to the content delivery network content server.

5. The client computing device of claim 1, wherein the processor is further operable to modify the list of domain names associated with the content delivery network.

6. The client computing device of claim 5, wherein modifying the list of domain names occurs in response to the domain name system request.

7. The client computing device of claim 1, wherein list of domain names is downloaded from a content delivery network software server.

8. A method comprising:
   receiving a prompt from a content delivery network to download a list of domain names that are associated with the content delivery network, the content delivery network having a content delivery network domain name system server;
   providing a reply to the prompt:
   downloading the list of domain names from the content delivery network in response to the reply;
   originate a first domain name system request including a first domain name;
   determining whether the first domain name is in the list of domain names;
   if the first domain name is not in the list, directing the domain name system request to an Internet service provider domain name system server; and
   if the first domain name is in the list:

directing the first domain name system request to a content delivery network domain name system server;

receiving a first reply that includes an Internet protocol address from the content delivery network domain name system server, the Internet protocol address being associated with a content delivery network content server; and directing a first content request to the content delivery network content server.

9. The method of claim 8, further comprising, in response to directing the first content request, receiving a response that includes information from the content delivery network content server.

10. The method of claim 9, further comprising:

receiving a second domain name system request including a second domain name;

determining whether the second domain name is in the list; and in response to determining that the second domain name is in the list, directing a second content request to the content delivery network content server.

11. A method comprising:

receiving a domain name system request;

determining a source Internet protocol address of the domain name system request:

in response to determining the source Internet protocol address:

send a prompt to a client system associated with the source Intent protocol address;

receive a reply from the client system; and in response to receiving the reply, selecting a first content delivery network content server from among a plurality of content delivery network content servers, wherein the first content delivery network content server is selected for being closer to the source Internet protocol address than other of content delivery network content servers;

in response to selecting the first content delivery network content server:

composing a first file, wherein the first file includes:

a list of domain names that are associated with the content delivery network; and a first content delivery network content server Internet protocol address associated with the first content delivery network content server; and sending the first file to the client system.

12. The method of claim 11, further comprising:

after sending the file to the client system, waiting a predetermined amount of time;

selecting a second content delivery network content server, wherein the second content delivery network content server is selected as being closer to the source Internet protocol address than other of the plurality of content delivery network content servers, except for the first content delivery network content server;

in response to selecting the second content delivery network content server, composing a second file, wherein the second file includes:

the list of domain names; and a second content delivery network content server Internet protocol address associated with the second content delivery network content server; and sending the second file to the client system.

13. The method of claim 12, wherein the first file includes a host file.

14. A non-transitory computer readable medium configured to store a program of instructions configured to manipulate a processor, the program of instructions comprising:

instructions to receive a prompt from a content delivery network to download a list of domain names that are associated with the content delivery network, the content delivery network having a content delivery network domain name system server;

instructions to provide a reply to the prompt:

instructions to download the list of domain names from the content delivery network in response to the reply;

instructions to originate a first domain name system request including a first domain name;

instructions to determine whether the first domain name is in the list of domain names;

instructions to direct the first domain name system request to the Internet service provider domain name system server if the first domain name is not in the list; and if the first domain name is in the list:

instructions to direct the first domain name system request to the content delivery network domain name system server;

instructions to receive a first reply that includes an Internet protocol address from the content delivery network domain name system server; and in response to receiving the first reply, instructions to direct a first content request to the Internet protocol address.

15. The computer readable medium of claim 14, wherein the Internet protocol address is to a content delivery network content server.

16. The computer readable medium of claim 15, the program of instructions further comprising instructions to receive a second reply that includes information from the content delivery network content server in response to directing the first content request.

17. The computer readable medium of claim 16, the program of instructions further comprising:

instructions to receive a second domain name system request including a second domain name;

instructions to determine whether the second domain name is in the list; and instructions to in response to determining that the second domain name is in the list, direct a second content request to the content delivery network content server.

18. The computer readable medium of claim 14, the program of instructions further comprising instructions to modify the list of domain names associated with the content delivery network.

19. The computer readable medium of claim 18, wherein modifying the list of domain names occurs in response to the domain name system request.

20. The computer readable medium of claim 14, wherein list of domain names is downloaded from a content delivery network software server.

* * * * *